United States Patent [19]
Longenecker

[11] 3,780,546
[45] Dec. 25, 1973

[54] TRAILER HITCH LOCK
[76] Inventor: Ernst A. Longenecker, 17820 Robinwood, Brookfield, Wis. 53005
[22] Filed: Nov. 10, 1972
[21] Appl. No.: 306,027

[52] U.S. Cl. .................................. 70/58, 280/507
[51] Int. Cl. ............................................ E05b 73/00
[58] Field of Search .................... 70/57, 58, 258; 280/507

[56] References Cited
UNITED STATES PATENTS
| | | | |
|---|---|---|---|
| 3,237,969 | 3/1966 | Geresy | 70/258 X |
| 3,410,580 | 11/1968 | Longenecker | 280/507 |
| 3,492,023 | 1/1970 | Thompson | 70/258 X |
| 3,526,110 | 9/1970 | Foote | 70/58 X |

Primary Examiner—Robert L. Wolfe
Attorney—Ira Milton Jones

[57] ABSTRACT

An anti-theft device securable by a key controlled lock to the coupler on the front end of a trailer to obstruct access to the socket of the coupler and thereby prevent insertion of the ball of a ball and socket connection by which the trailer can be coupled to a towing vehicle. A cover member slips onto the coupler to close the mouth of the socket and is secured in place by simply inserting the body of a padlock into a cavity in the cover member. No tool is needed to lock the cover member to the coupler.

16 Claims, 21 Drawing Figures

TRAILER HITCH LOCK

This invention is concerned with the problem of guarding against the theft of vehicular trailers by making it impossible to couple the ball and socket of the trailer hitch by which the trailer would have to be attached to the unauthorized towing vehicle. While that objective has been attained before, notably by the hitch lock of the Longenecker U.S. Pat. No. 3,410,580 and by the trailer coupler cover lock of the Foote U.S. Pat. No. 3,526,110, these prior anti-theft devices were saddled with a psychological deterrent to their use. To gain the desired strength and security against being pried loose, which was a most serious drawback of earlier anti-theft devices such as those of the Geresy U.S. Pat. Nos. 3,139,291; 3,226,133 and 3,237,969, the Longenecker and Foote locks employed set screws which either directly or indirectly tightened the locking device to the coupler of the trailer in a position obstructing access to the ball-receiving socket, and used the presence of a lock body in a cavity in the housing of the lock device to block access to the set screw. There is no doubt but that the anti-theft devices of both of these patents afforded excellent protection against having one's trailer towed away by a thief, but the need for using a tool — usually an Allen wrench, to tighten the set-screw made an attention attracting production out of what should have been a simple inconspicuous operation.

Experience has demonstrated that people seem to be self-conscious about putting a lock on their trailer when others in the area — as in a trailer park — are not doing so. Apparently the application of a lock infers lack of trust, or at least undue concern about losing the trailer. These deterrents to the use of an anti-theft device to prevent unauthorized "tow away" of a trailer are lessened in proportion to the degree of simplification and expedience with which the lock can be applied to the coupler of the trailer. To that end this invention has as its purpose and object the provision of a reliable anti-theft device which can be quickly and easily applied to the trailer coupler — entirely without the use of any tool — and which, upon being applied, can be removed only by the use of a proper key.

Since the cover type of anti-theft device such as that illustrated in FIG. 4 of the Longenecker patent and in the Foote patent, has the advantage of keeping abrasive dirt and dust off the greasy inner surface of the coupler socket, while it also keeps the thief's tow ball out of the socket, this invention is an improvement upon that type of anti-theft device.

In every one of the various embodiments of the invention disclosed herein, the cover member not only blocks entry of a tow ball into the coupler socket and effectively prevents abrasive dirt and dust from lodging on the inner surface of the socket, but is also a rugged unit, preferably in the form of a casting, with great strength so that it cannot be broken by any ordinary means nor pried off the coupler in any surreptitious manner.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of the embodiments of the invention constructed according to the best modes so far devised for the practical application of the principles thereof, and in which.

Figure 1:
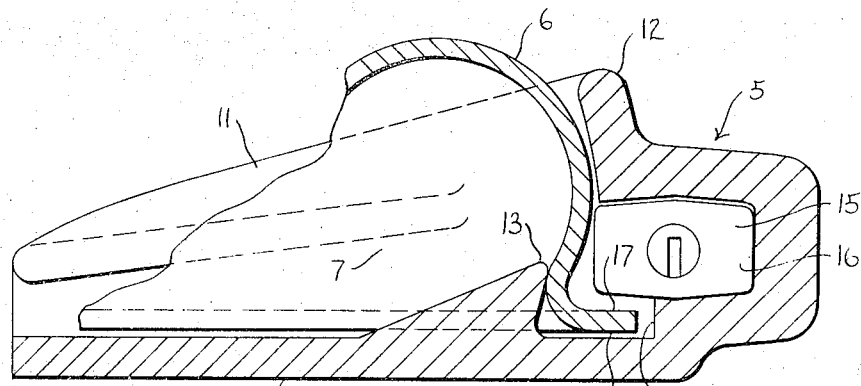
FIG. 1 is a longitudinal sectional view through one embodiment of the anti-theft device of this invention, illustrating the same in position on the coupler of a trailer, only a portion of the socket of the coupler being shown.

Before entering into a detailed description of the different embodiments of the invention disclosed herein, it would be well to observe that in every case the desired locking function is achieved by slipping a cover member 5 onto the coupler 6 which is that part of the trailer hitch located at the extremity of the draw bar which projects from the front of the trailer and by which the trailer is towed. As is customary, the coupler 6 has a downwardly opening socket 7 which receives the ball (not shown) of the ball and socket hitch by which the trailer is coupled to a towing vehicle, it being understood that the ball is carried by structure appropriately mounted on the vehicle.

Thus, by applying the cover member 5 to the coupler across the downwardly facing mouth of the socket to close off or at least obstruct entry into the socket, and locking the cover member against unauthorized removal, theft of the trailer is thwarted, at least by attaching it in the conventional way to a towing vehicle.

A characteristic of the vast majority of trailer couplers is an outwardly projecting horizontally disposed marginal flange 8 that extends around the perimeter of the front end portion of the mouth of the socket and for some distance rearwardly of the socket. This flange is utilized in the attachment of the cover member 5 to the coupler, and to that end the cover member in every instance has a peripheral inwardly opening groove 9 to have "tongue and groove" connection with the flange 8. By that connection, which is quickly and easily effected by simply sliding the cover member rearwardly onto the coupler, the cover member is held against movement from its operative socket-mouth-obstructing position except by sliding the cover forwardly, and it is that movement of the cover member that is precluded by the key controlled locking device incorporated in the cover member in one form or another in the various embodiments of the invention disclosed.

As will no doubt be appreciated from an inspection of the drawings, the cover member, in every instance, is strong and capable of withstanding practically any attempt to break it or pry it from the trailer coupler. At least any such attack that could be made by an intending thief without arousing attention would be successfully resisted. Preferably the cover member — in all cases — is a casting.

Another salient feature of the invention is the reliable security it provides against theft of the trailer by destruction of the locking means by which the cover member is secured against unauthorized removal from the trailer coupler. In every case the body of the lock is nested in a cavity in the cover member in such a way that destructing or defeating access to it is impossible in its locked condition.

But most important, in every embodiment of the invention disclosed, the application of the cover member to the trailer coupler is accomplished by quickly sliding it in place and very inconspicuously actuating its locking means, which is done without the need for any tool as was the case in the prior trailer hitch locking devices of the Longenecker U.S. Pat. No. 3,410,580 and the Foote U.S. Pat. No. 3,526,110.

There now follows a description of the different embodiments of the invention illustrated by the drawings.

FIGS. 1 – 3

Figure 2:
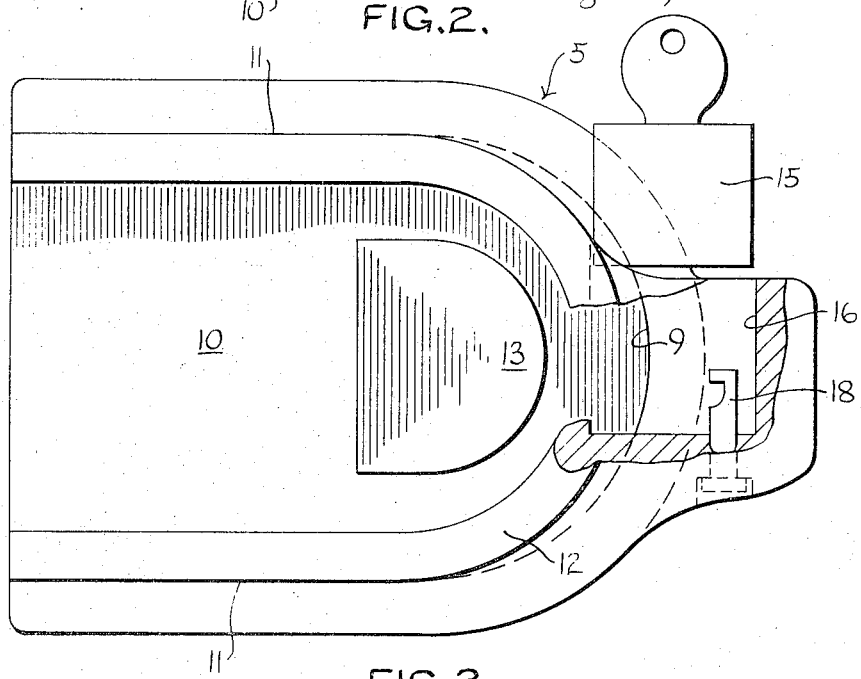
FIG. 2 is a top view of the anti-theft device shown in FIG. 1, with parts broken away and in section, and with the lock body, in this case a padlock, by which the device is secured in place, shown removed from its operative locking position.
Figure 3:
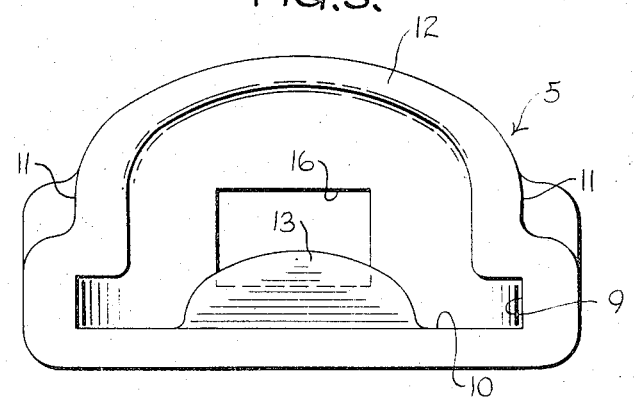
FIG. 3 is an end view, looking at the anti-theft device from the left in FIGS. 1 and 2.

In the embodiment of the invention shown in FIGS. 1 – 3, the cover member 5 has a flat U-shaped bottom wall 10 of a size to completely close the mouth or entrance to the socket 7. Side walls 11 rise from the opposite parallel side edges of the bottom wall to merge with a curved end wall 12 that projects from the rounded end of the bottom wall. The side walls 11 have inclined upper edges so that the side walls increase in height as they approach the end wall 12, and the grooves 9 which slidably receive the oppositely directed flanges 8 of the coupler, are contiguous to the bottom wall and have increasing width towards the end wall 12. This increasing width of the grooves 9 permits the closed end of the cover member a degree of up and down movement to enable a lug or abutment 13 which rises from and is integral with the bottom wall 10 to be moved past the front edge of the mouth of the socket and in the operative position of the cover member to abut said front edge of the socket and prevent sliding the cover member off the coupler as long as the front end of the cover member is restrained against downward displacement with respect to the coupler.

With the cover member in its operative position, downward movement of its front end portion to a position at which its lug or abutment 13 can clear the front edge portion of the mouth of the socket is prevented by the presence of the body 15 of a padlock inserted into a cavity 16 in the end wall 12 of the cover member. The cavity 16 opens inwardly towards the lug or abutment 13 to enable the lock body to overlie the portion 17 of the flange 8 at the front end of the coupler and thereby prevent removal of the cover member from the coupler as long as the body of the padlock is in the cavity. As in the aforesaid Longenecker patent, the padlock body is held in the cavity by entry into the lock body of a notched prong 18 that is fixed in the cover member and projects into the cavity. Upon complete insertion of the lock body into the cavity, the keeper (not shown) of the padlock grips the notched prong and secures the lock body against removal from its operative position except by the use of a proper key.

FIGS. 4 – 7

The cover member in that form of the invention shown in FIGS. 4 – 7 has a flat oval shaped bottom wall 20 of a size to cover the entire downwardly opening mouth of the socket 7 and a U-shaped wall 21 extending upwardly from the side edges and front end of the bottom wall. An inturned flange 22 on the upper edge of the U-shaped wall overlies the bottom wall to provide the groove 9 in which the flange 8 of the coupler is received, this "tongue and groove" connection securing the cover member against displacement from the coupler except by a straight forward rectilinear motion.

However, such forward motion of the cover member is possible only when a pivoted latch or locking lever 23 is in its inoperative position. The latch or lever 23 occupies a narrow elongated groove 24 in the cover member that extends longitudinally for almost its full length and opens not only through the top of the wall 20 but also to the front end of the cover member. An eccentrically adjustable pivot pin 25 pivotally connects the latch or lever with the cover member for movement to and from an operative position in which the free end portion of the latch or lever projects through the open top of the groove into the socket and the extremity 26 of the latch or lever is engageable with the front surface of the socket to prevent removal of the cover member from the coupler. Adjustment of the eccentric pivot pin shifts the axis about which the latch or lever swings.

The groove 24 transversely intersects a cavity 27 formed in the cover member and opening to one side thereof. The cavity 27 is of a size to snuggly and completely receive the body 28 of a padlock, the hasp 29 of which is accommodated by a smaller cavity 30 in the cover member behind the cavity 27. A pin 31 fixed in the cover member and straddled by the legs of the hasp, secures the hasp against displacement, and when the lock body is pushed in to effect locking engagement of its keeper (not shown) with the notched leg of the hasp, the lock body will be held in an operative position at which its inner end portion protrudes into the groove 24.

Figure 4:
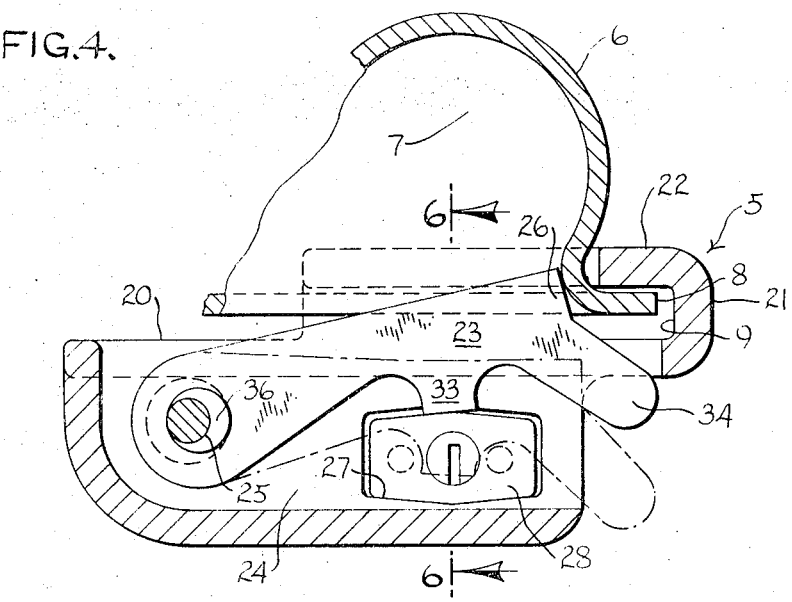
FIG. 4 is a view similar to FIG. 1 of another embodiment of the anti-theft device of this invention, in which a pivoted latch movable to and from an operative position protrudes into the socket to preclude removal of the cover member as long as the latch is in its operative position.
Figure 5:
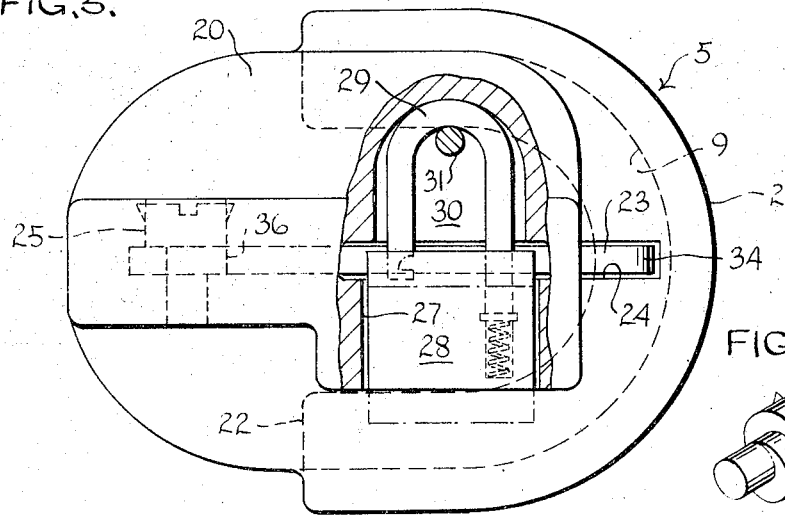
FIG. 5 is a bottom view of the FIG. 4 embodiment of the anti-theft device.

Since the movement of the latch or lever 23 to a lowered inoperative position, shown in light broken lines in FIG. 4, is necessary to enable the cover member to be slid onto the coupler, the padlock must be in its unlocked condition in which no part of its body 28 projects into the groove. The projection of the legs of the hasp across the groove does not interfere with movement of the latch or lever 23 to its lowered inoperative position since the lower edge thereof is shaped to accommodate the legs; but a foot 33 which moves between the hasp legs when the lock body is in its projected inoperative position, abuts the lock body when the latter is in its operative position locked to the notched one of its legs, to thereby hold the latch or lever in its operative position preventing removal of the cover member from the coupler.

It will be evident that in this embodiment of the invention the body of the padlock does not ever become detached from the cover member, and that only a short inward movement of the lock body secures the cover member in place, it being understood that the latch or lever must be in its lifted operative position before the lock body can be pushed in. To facilitate lifting the latch or lever to its operative position a handle portion 34 on its free end protrudes from the adjacent open end of the groove 24.

Figure 7:
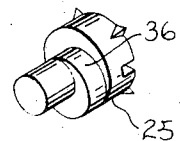
FIG. 7 is a detail perspective view of one of the parts of the trailer hitch lock shown in FIGS. 4 - 6.
Figure 6:
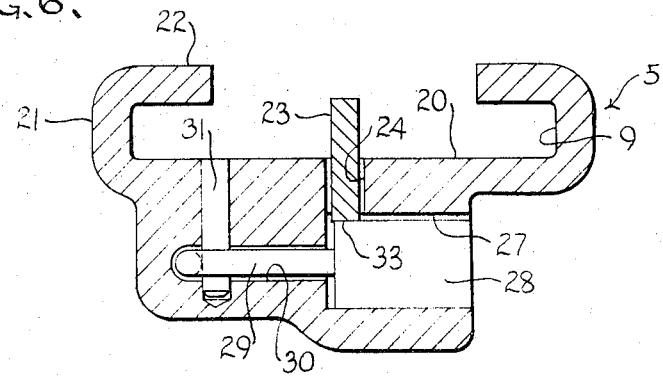
FIG. 6 is a cross sectional view through FIG. 4 on the plane of the line 6—6, sans the socket.

As noted hereinbefore, the location of the axis about which the latch or lever swings may be adjusted. Such adjustment shifts the latch or lever lengthwise of itself to thus better adapt the unit to variously dimensioned couplers. For this purpose, the pivot pin 25 by which the latch or lever is connected with the cover member, has an eccentric medial portion 36 (FIG. 7). Thus upon insertion of the pin into the socket in the cover member with its medial portion 36 providing a journal for the latch or lever, rotation of the pin shifts the free end of the lever or latch towards or from the surface of the socket against which it abuts. Any adjustment needed to fit the latch to a particular coupler is thus easily effected, and then when that is done the pin 25 is driven home to secure it against further rotation.

FIGS. 8 – 10

Figure 8:
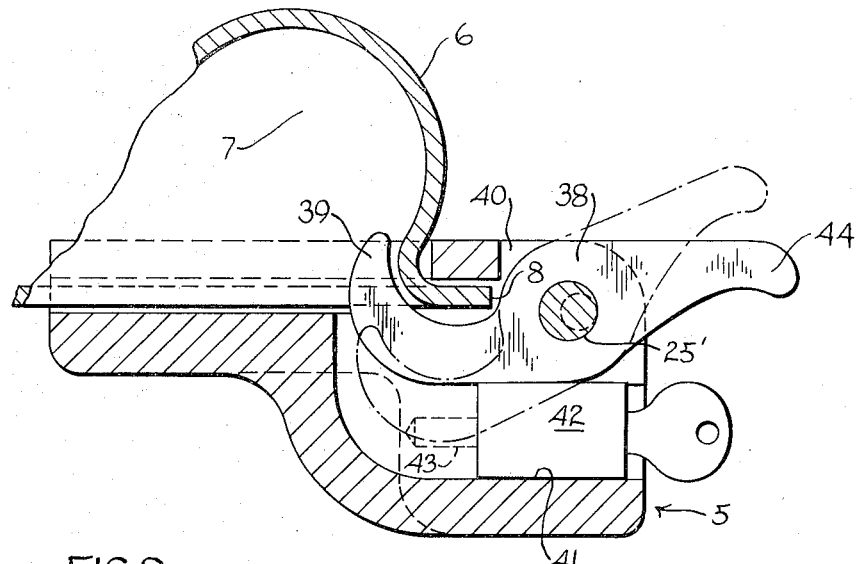
FIG. 8 is a longitudinal sectional view through a trailer hitch lock very much like that of FIGS. 4 - 6.
Figure 9:
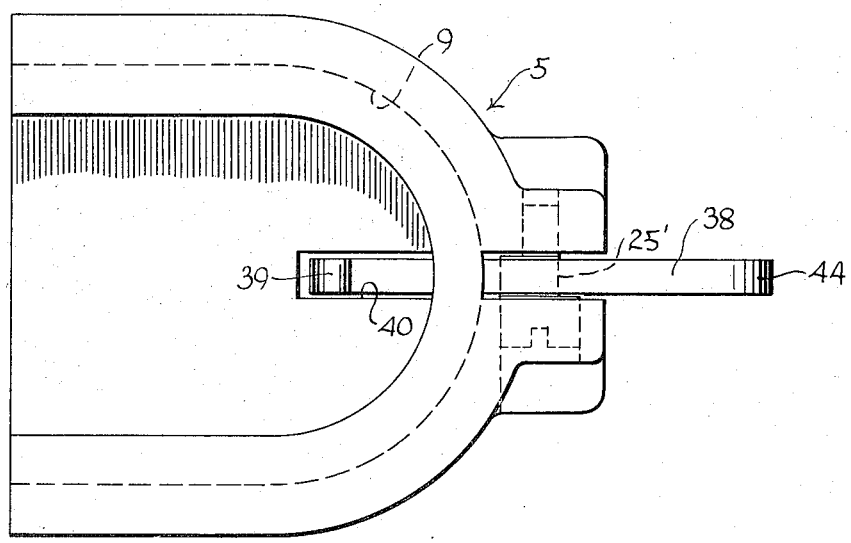
FIG. 9 is a top view of the trailer hitch lock shown in FIG. 8.
Figure 10:
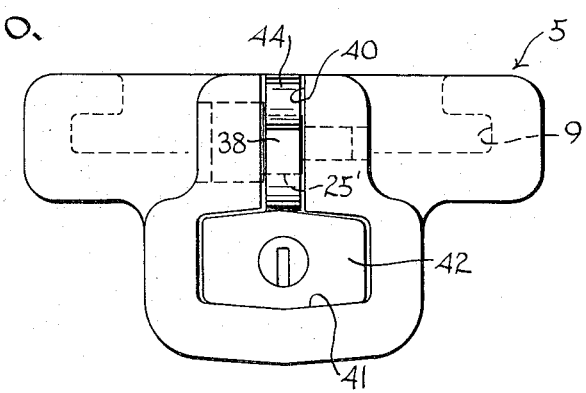
FIG. 10 is an end view of the lock of FIGS. 8 and 9.

The embodiment of the invention shown in FIGS. 8 – 10 is a variation of the one just described, in that it too employs a pivoted lever or latch 38 to hold the cover member in place on the coupler. But in this case the lever or latch is pivoted at its middle and has a hook 39 at one end to enter the socket and abut the front inner surface of the socket. By such abutment, movement of the cover member out of its operative position closing the mouth of the socket is prevented. The lever or latch 38 is received in a slot 40 which opens to the top and front end of the cover member and also communicates with a cavity 41 of such size and shape to receive the body 42 of a padlock. In this case the lock body is fully removable from the cavity. In its inserted position, where it is held by being engaged with the hooked end of a prong 43 fixed in the cover member, the lock body extends across the bottom of the slot 40 and bears against the adjacent flat edge of the lever or latch to hold it against rocking about its pivot 25'.

As in the form of the invention shown in FIGS. 4 – 7, the lever or latch has a handle portion 44 to facilitate moving it to and from its operative position, and its pivot is of the same type so as to allow for adjustment of the location of the pivot axis to accommodate differently dimensioned sockets.

FIGS. 11 – 13

Figure 11:
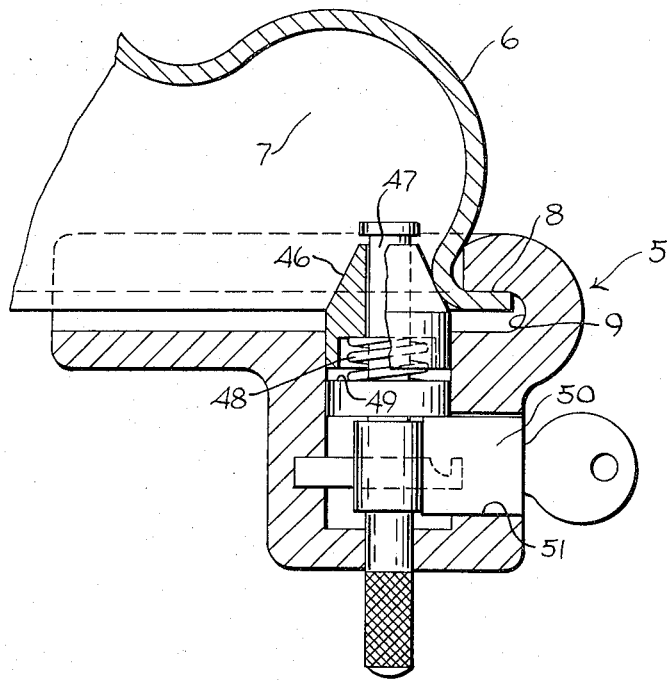
FIG. 11 is a longitudinal sectional view through a trailer hitch lock, embodying the invention in another form.
Figure 12:
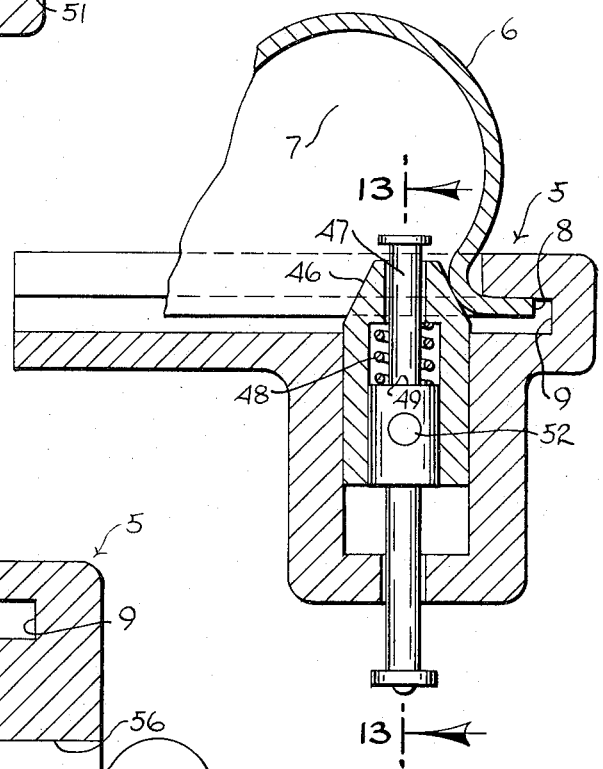
FIG. 12 is a longitudinal sectional view similar to FIG. 11, illustrating a variation of that form of the invention shown in FIG. 11.
Figure 13:
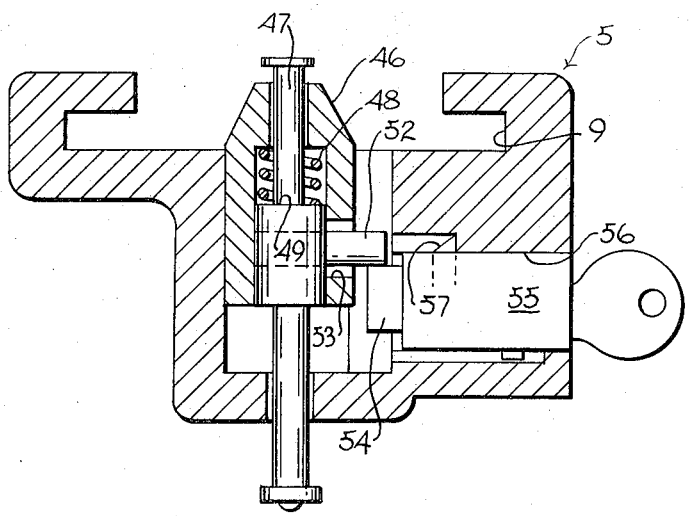
FIG. 13 is a sectional view through FIG. 12 on the plane of the line 13—13.

The two closely related embodiments of the invention shown in FIGS. 11 – 13 have in common automatic adjustment or self location of a plunger type retaining member which enters the socket of the coupler and cams itself against the lip or edge of the socket. In each case the retaining member is a cup-shaped plunger 46 slidably mounted on a stem 47 and yieldingly urged upwardly by a compression spring 48 reacting between the plunger and a shoulder 49 on the stem. The plunger-stem assembly is axially movable to and from its operative position by means of the lower end of the stem which projects from the underside of the cover member.

The upper end of the plunger 46 is conical to provide a cam surface that is forced against the lip of the socket as the stem is pushed upward, it being understood that the plunger will automatically assume a position wedged against the lip of the socket and that the compression spring will maintain that engagement as long as the stem is held against descent. This is done by inserting the body 50 of a padlock into a cavity 51 in the FIG. 11 device as in those embodiments of the invention shown in FIGS. 1 and 8. In FIGS. 12 and 13 a pin 52 projects radially from the medial portion of the stem 47 through a slot 53 in the cup-shaped plunger to be engaged by a boss 54 on the inner end of a lock cylinder 55 slidably mounted in a bore 56 in the cover member. The lock cylinder in this embodiment of the invention, constitutes the "body of the lock" as this term has been used herein. It may be of any conventional form with a tumbler carrying barrel (not shown) which upon key actuated rotation retracts a bolt 57 to free the cylinder for outward axial movement to a position in which its boss 54 is clear of the pin 52. As is conventional the cylinder is held against turning in its bore and a spring (not shown) automatically projects it to its inoperative position upon retraction of the lock tumblers by a proper key.

FIGS. 14 AND 15

Figure 14:
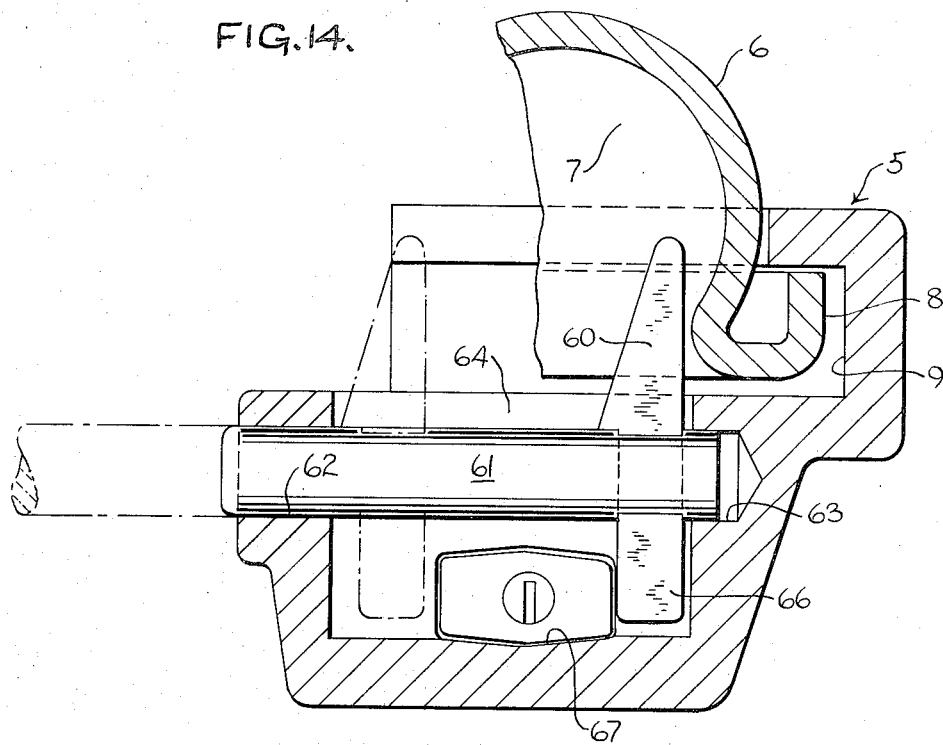
FIG. 14 is a longitudinal sectional view through a trailer hitch lock embodying the invention in still another form.
Figure 15:
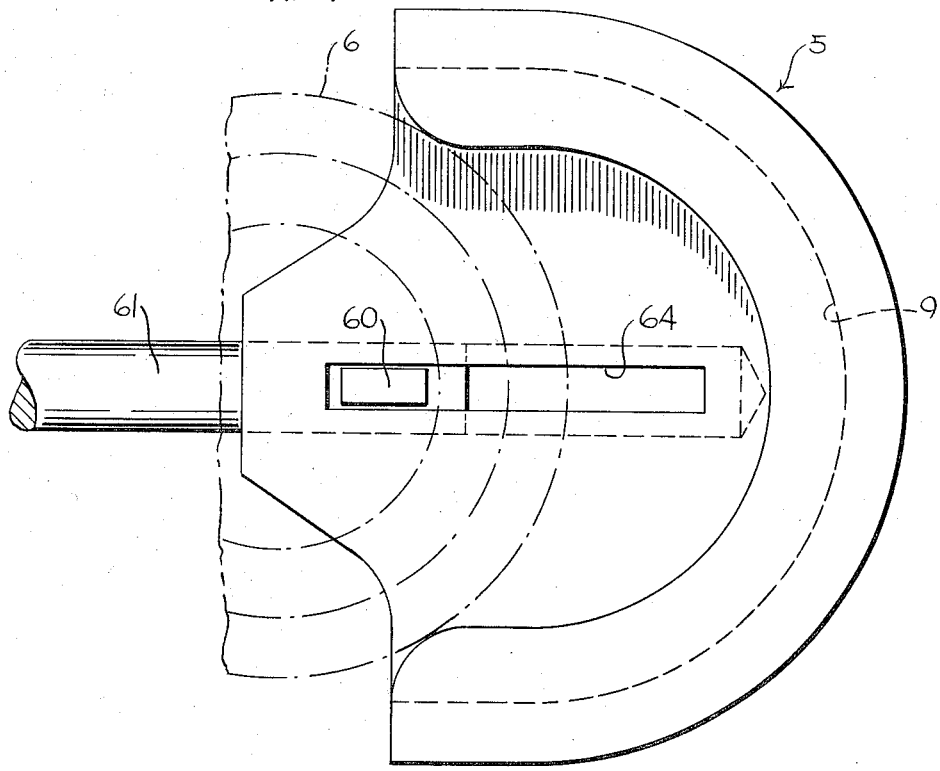
FIG. 15 is a top view of the trailer hitch lock shown in FIG. 14.

The form in which the invention is embodied in FIGS. 14 and 15 features a retaining member 60 that is carried by a rod 61 slidably mounted in the cover member, for movement between operative and inoperative positions (shown in FIG. 14 respectively in full and broken lines). In its operative position the retaining member projects into the socket and is directly adjacent to the inner edge of the forward portion of the socket to hold the cover member on the coupler.

The rod 61 is slidably mounted in a bore 62 in the rear portion of the cover member and in the operative position of the retaining member, the front end of the rod projects into a pocket 63 at the front of the cover member. A flat-walled slot 64 in the cover member accommodates the retaining member 60 and an arm 66 projecting downwardly from the rod, as the retaining member is moved between its operative and inoperative positions. As indicated in FIG. 15 where the front end of the coupler is depicted in light broken lines, the cover member can be slid forward on the coupler far enough to enable it to be lifted therefrom when the retaining member is retracted to its inoperative position.

The lower portion of the slot 64 intersects a cavity 67 in which the body of a padlock or other type of lock is received to block retraction of the retaining member by lying athwart the path of the arm 66.

FIGS. 16 – 18

Figure 16:
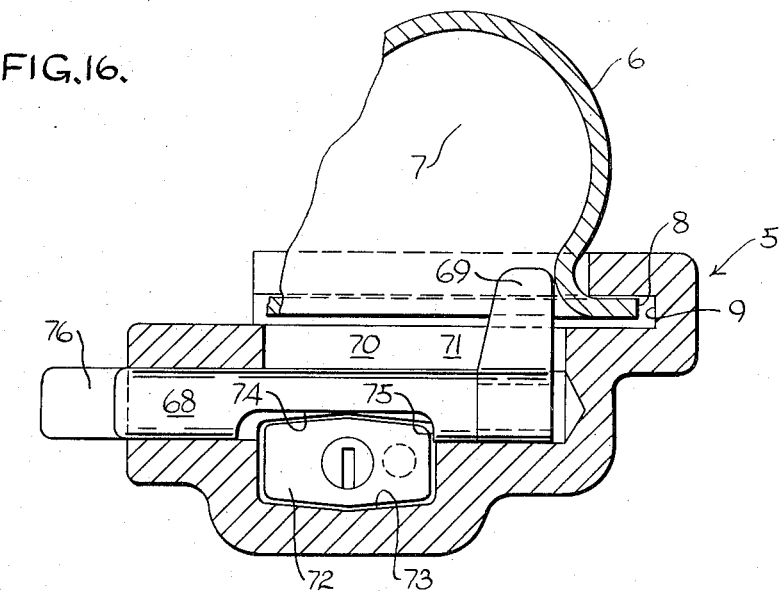
FIG. 16 is a longitudinal sectional view through a trailer hitch lock illustrating a variation of that embodiment of the invention shown in FIGS. 14 and 15.
Figure 17:
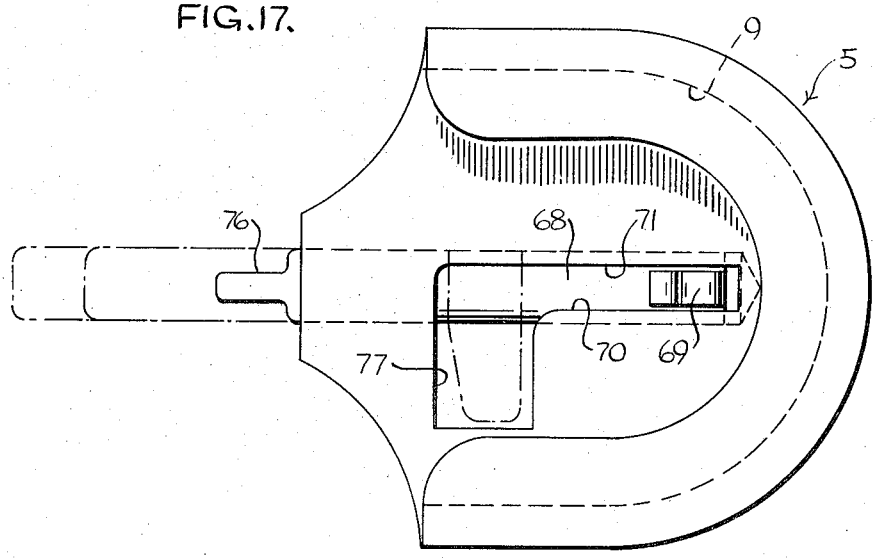
FIG. 17 is a top view of the trailer hitch lock shown in FIG. 16.
Figure 18:
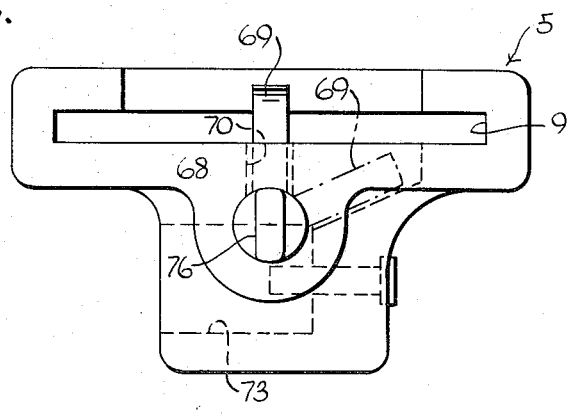
FIG. 18 is an end view of the lock of FIGS. 16 and 17.

The embodiment of the invention shown in FIGS. 16, 17 and 18 is quite similar to the one just described, the difference being that here the rod 68 on which the retaining member 69 is mounted is rotated to swing the latter to its inoperative position (shown in broken lines in FIG. 18) in which it lies wholly below the level of the coupler. Accordingly, the distance the rod must be shifted in bringing the retaining member to and from its operative position is shorter. To accommodate the retaining member, an L-shaped slot 70 is formed in the bottom wall of the cover member, the long leg 71 of which guides the retaining member in its edgewise movement towards and from operative position, and holds it in that position when the body 72 of a lock is in place in its cavity 73. A notch 74 in the rod accepts the lock body and provides an abutment 75 which collides with the lock body to prevent endwise shifting of the rod 68 and the retaining member thereon out of its operative position.

Upon removal of the lock body, the rod can be shifted to carry the retaining member out of its operative position, and when fully retracted can be rotated by means of its flattened end 76 — to swing the retaining member into the short leg 77 of the L-shaped slot.

FIGS. 19 – 21

Figure 19:
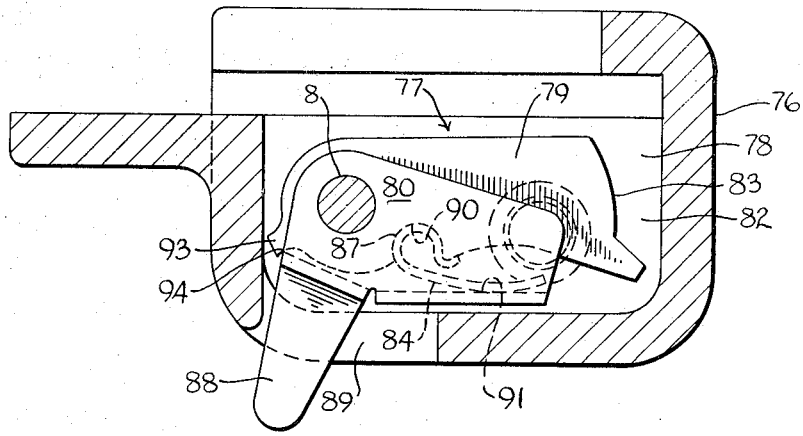
FIG. 19 is a longitudinal sectional view through a trailer hitch locking device in which the self-adjusting feature of those embodiments of this invention illustrated in FIGS. 11–13 is employed in a simpler less expensive manner, showing the same detached from the trailer coupler.
Figure 20:
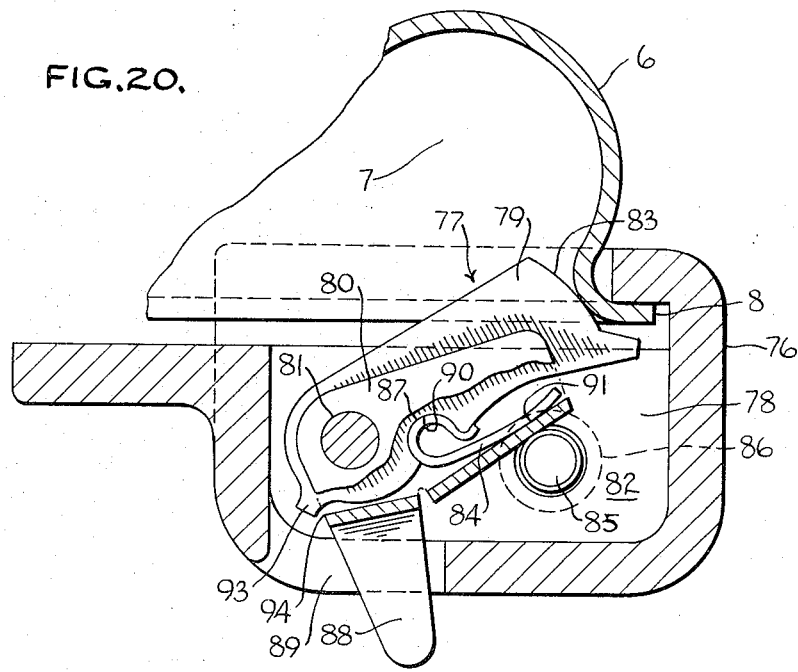
FIG. 20 is a view identical with FIG. 19 but showing the locking device on a trailer coupler.
Figure 21:
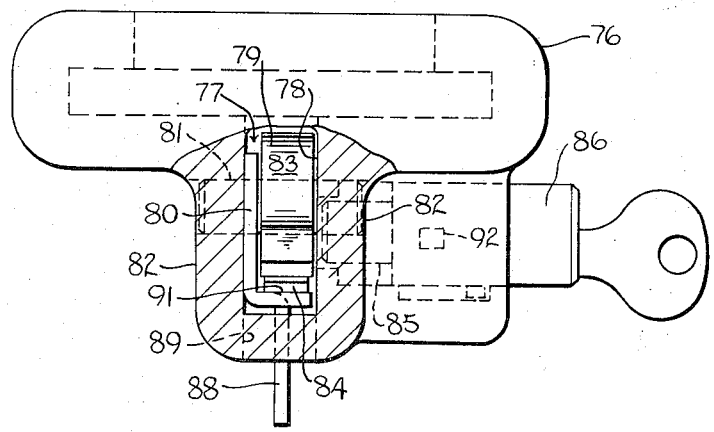
FIG. 21 is essentially an end view of the locking device but with part of its body structure in cross section on the plane of the line 21—21 in FIG. 19, and with the locking device in its unlocked condition.

The embodiment of the invention illustrated in FIGS. 19–21 incorporates the self-adjusting feature that characterizes the locking device of FIGS. 11–13, but does so in a simpler way. Here the body 76 of the locking device is a casting having its upper portion shaped to be slid onto the trailer coupler 6 to cover the mouth of the socket. As in other embodiments of the invention, the body 76 when in place on the coupler has interengagement with the marginal flange 8 that projects horizontally from the lip of the socket 7.

The blocking means by which removal of the body 76 is prevented except by use of a proper key, comprises a two part latch 77 located in a relatively narrow open topped cavity 78 in the body 76. The latch 77 consists of a primary lever 79 and a secondary lever 80 both pivotally mounted in the cavity 78 by a single pin 81 that spans the width of the cavity and has its end portions secured in its side walls. The primary lever 79 is quite husky and its free end portion is shaped to provide a curved cam surface 83 that is eccentric to the pivot axis of the levers. In its operative position the lever 79 projects into the socket 7 with its cam surface 83 bearing against the lip of the socket mouth as shown in FIG. 20. It is held in that position when the secondary lever 80 is moved to its operative position, by a leaf spring 84 which reacts between the two levers. The secondary lever 80 is held in its active or operative position shown in FIG. 20 by the reduced inner end portion 85 of a lock body 86. The spring 84 has a medial curled portion 89 and short and long end portions that are resiliently urged apart.

A handle 88 projecting downwardly from the secondary lever 80 through a slot 89 in the bottom of the cavity 78 enables the secondary lever to be moved to a position in which its bottom edge is above the inner end portion 85 of the lock body making it possible to push the lock body in to its operative locking position.

Both levers are simple stampings. The primary lever 79 has a reentrant pocket 90 opening to its bottom edge in which the curled medial portion 87 of the leaf spring is seated with its short end bearing against the underside of the lever and its long end projecting away from the lever to bear against a ledge 91 that extends inwardly from the bottom edge of the secondary lever.

The lock body 86 is of the type employed in that embodiment of the invention illustrated in FIG. 13 and hence consists simply of a cylindrical barrel from which the smaller diameter inner end portion 85 projects. The barrel is slidably but not rotatably mounted in a bore in the body of the locking device, that opens to the exterior of the body and into the cavity through a reduced diameter bore, into the cavity 78. A spring (not shown) urges the barrel outward and a spring pressed latch 92 engages behind a shoulder (not shown) to hold the barrel in its operative position (opposite that in which it is shown in FIG. 21) with its inner projection 85 under the secondary lever. Upon rotation of a cylinder equipped with key-retractable tumblers, the latch 92 is withdrawn to free the barrel for spring propelled movement to its inoperative position.

As will be evident, the resiliently yieldable connection between the primary and secondary levers provided by the spring 84 enables the primary lever to assume its most effective blocking position, despite inevitable variation in the dimensions of the trailer coupler; and to assure that the primary level will move out of its operative position upon key-actuated release of the lock, a projection 93 on the primary lever is located to be engaged by the adjacent edge 94 on the secondary lever as the latter is spring propelled to its inoperative position.

Those skilled in the art will appreciate that the invention can be embodied in forms other than as herein disclosed for purposes of illustration.

This invention is defined by the following claims.

I claim:

1. In an anti-theft device for guarding against unauthorized towing of a trailer by obstructing entry into the downwardly opening socket on the coupler of the trailer, said anti-theft device being of the type wherein a cover member readily attachable to the coupler is movable to an operative position thereon in which it blocks entry into the mouth of the socket, improved locking means for securing the cover member against displacement from its operative position, comprising:

A. motion blocking means on the cover member positioned to enter the socket and, by engagement with a surface fixed with respect to the socket, prevent movement of the cover member out of its operative position;

B. a cavity in the cover member adjacent to said motion blocking means;

C. a lock body movable to and from an operative position in said cavity, in which position the lock body itself prevents movement of said motion blocking menans to a position clear of said surface; and D. key controlled means in the lock body for securing the lock body in its operative position.

2. The improvement set forth in claim 1, wherein said motion blocking means is an abutment on the cover member so situated thereon that the portion of the cover membr on which said abutment is located must be moved downwardly with respect to the socket to allow movement of the cover member out of its operative position, and wherein the lock body when in its operative position has a part thereof overlying a flange on the coupler, to prevent downward movement of said portion of the cover member.

3. The improvement set forth in claim 1, wherein said motion blocking means is an abutment projecting from the cover member to enter the socket and by its presence therein prevent movement of the cover member out of its operative position, withdrawal of said abutment from the socket requiring downward movement with respect to the coupler of that part of the cover member on which the abutment is located; and wherein the presence of the lock body in said cavity prevents such downward movement.

4. The improvement set forth in claim 3, wherein said cavity in the cover member has an open side facing said abutment, and wherein the lock body in its operative position protrudes through said open side of the cavity towards said abutment and overlies a part on the coupler fixed with respect to the socket to prevent downward movement with respect to the coupler of that part of the cover member on which the abutment is located.

5. The improvement set forth in claim 1, further characterized in that said means by which the presence of the lock body in its operative position in said cavity prevents movement of the cover member out of its operative position comprises:

a lever pivotally connected with the cover member to swing to and from an operative position in which a portion thereof protrudes into the socket to prevent movement of the cover member out of its operative position, said lever also having a part thereof positioned to enter said cavity in the cover member and which part must enter said cavity for the lever to move out of its operative position; and wherein the presence of the lock body in its operative position in said cavity blocks entry of said part of the lever into said cavity.

6. The improvement set forth in claim 5, wherein said portion of the lever which protrudes into the socket to prevent movement of the cover member out of its operative position is the free end of the lever; wherein said free end of the lever abuts the adjacent surface of the socket in preventing movement of the cover member out of its operative position; wherein movement of the cover member out of its operative position can take place in only one direction; wherein the axis of the pivot about which the lever swings is transverse to said direction; and further characterized by means for adjusting the location of the axis about which the lever swings, to thereby shift the free end of the lever towards or from said surface of the socket which it abuts.

7. The improvement set forth in claim 6 wherein the means for adjusting the location of the lever pivot axis comprises an eccentric pivot pin securable in an adjusted position.

8. The improvement set forth in claim 5, wherein the cover member is formed with an elongated slot opening to the face thereof which is subjacent to the downwardly opening mouth of the socket when the cover member is in its operative position, said slot transversely intersecting said cavity and having an open end adjacent to the cavity; the lever being located in said slot and having its free end portion projecting through the open end thereof to provide a handle by which the lever may be moved to its operative position projecting above said face of the cover member; and wherein the lock body is that of a padlock having a U-shaped hasp, one leg of which constitutes the locking leg of the hasp, the hasp being received in the closed inner portion of said cavity with its legs projecting towards the mouth of the cavity to provide for securement of the locking leg of the hasp to the lock body when the latter is pushed farther into the cavity to its operative position, in which position only a part of the lock body projects into said slot to block movement of said lever out of its operative position so that upon key actuated release of the lock body from the locking leg of the hasp a relatively short movement of the lock body towards the open end of the cavity frees the lever for movement out of its operative position; and wherein retaining means fixed in the cover member and straddled by the legs of the hasp keeps the padlock assembled with the cover member.

9. The improvement set forth in claim 5, wherein the cover member has a slot opening to the face of the cover member which is subjacent to the downwardly facing mouth of the socket when the cover member is in its operative position, said slot also opening to said cavity in the cover member; the pivot axis about which the lever rocks being above the cavity, and the lever having an inner hooked end which in the operative position of the lever projects into the socket to engage a wall thereof to prevent movement of the cover member out of its operative position, and having an outer handle forming portion projecting from the slot to provide for movement of the lever to its operative position; and wherein the lock body when seated in said recess engages the lever and secures it against rocking out of its operative position.

10. The improvement set forth in claim 1, wherein said motion blocking means is a movable rigid member constrained to up and down movement with respect to the cover member; wherein said rigid member is yieldingly urged upward to a position in which a portion thereof engages the lip of the socket; and wherein said portion of the rigid member is shaped to have wedging engagement with the lip of the socket.

11. The improvement set forth in claim 10 wherein said movable rigid member is a round plunger slidably mounted in a bore in the cover member; and wherein the upper end portion of said plunger is connical to provide for said wedging engagement.

12. The improvement set forth in claim 1, wherein said motion blocking means is a pair of pivoted levers having a common pivot axis, and a spring reacting therebetween to yieldingly urge them apart; means on one of said members by which it may be moved to an active position in which said spring projects the other lever into the socket of the trailer coupler; and a curved cam surface on said other lever to engage the lip of the socket with a wedging action.

13. The improvement set forth in claim 11, wherein the plunger is slidably mounted on a stem which in turn is slidably received in a bore in the cover member and has an end portion projecting from the bottom of the cover member to provide a handle by which the plunger can be raised and lowered; wherein a spring confined between abutments on the plunger and said stem yieldingly urges the plunger upward with respect to said stem; and wherein the lock body in its operative position has a part thereof engaged by a surface fixed with respect to said stem when the stem is in its lifted position, whereby the stem is held in its lifted position holding the plunger through said spring in engagement with the lip of the socket.

14. The improvement set forth in claim 1, wherein said motion blocking means includes an arm projecting upwardly from a rod that is slidably mounted in the cover member for fore and aft movement, to and from an operative position contiguous to the front edge of the lip of the socket; wherein a slot that opens through the top of the cover member receives said arm and guides its motion to and from its operative position; and wherein said blocking means has a surface accessible from said cavity in which the lock body is received, so that the lock body in said cavity can engage said surface and thereby prevent mount of said blocking means out of its operative position.

15. The improvement set forth in claim 14 wherein said surface of the blocking means is on a downwardly projecting foot on said rod, which foot is received in the bottom portion of said slot; and wherein said cavity in which the lock body is received opens to the bottom portion of said slot below said rod, so that the lock body in said cavity is in position to have the downwardly projecting foot abut the lock body and thereby restrain said arm against movement out of its operative position.

16. The improvement set forth in claim 14, wherein said slot opens to a laterally extending cavity in the cover member into which said arm may be lowered when the rod is retracted and in its retracted position is rotated.

* * * * *